(12) United States Patent
Sawada et al.

(10) Patent No.: US 7,470,316 B2
(45) Date of Patent: Dec. 30, 2008

(54) INK SET FOR INK JET PRINTING

(75) Inventors: Hidemasa Sawada, Nagoya (JP);
Takashi Kawaguchi, Nagoya (JP);
Akiko Mizuno, Nagoya (JP); Shiro Mori, Kawanishi (JP)

(73) Assignees: Brother Kogyo Kabushiki Kaisha, Nagoya (JP); Fuji Pigment Co., Ltd., Kawanishi (JP)

( * ) Notice: Subject to any disclaimer, the term of this patent is extended or adjusted under 35 U.S.C. 154(b) by 7 days.

(21) Appl. No.: 11/319,275

(22) Filed: Dec. 29, 2005

(65) Prior Publication Data

US 2006/0135648 A1   Jun. 22, 2006

Related U.S. Application Data

(63) Continuation-in-part of application No. 11/024,900, filed on Dec. 30, 2004, now abandoned.

(30) Foreign Application Priority Data

Jan. 14, 2004   (JP) ............................. 2004-007007

(51) Int. Cl.
*C09D 11/02* (2006.01)
*B41J 2/01* (2006.01)
*B05D 5/06* (2006.01)
*B05D 3/02* (2006.01)

(52) U.S. Cl. ...................... 106/31.6; 523/160; 347/100; 427/258; 427/372.2

(58) Field of Classification Search ................ 106/31.6; 523/160; 347/100; 427/258, 372.2
See application file for complete search history.

(56) References Cited

U.S. PATENT DOCUMENTS

| | | | |
|---|---|---|---|
| 5,853,861 A | 12/1998 | Held | 428/207 |
| 6,665,095 B1 | 12/2003 | Janssen et al. | 358/2.1 |
| 6,717,699 B1 | 4/2004 | Janssen et al. | 358/2.1 |
| 2003/0128246 A1* | 7/2003 | Redding et al. | 347/13 |
| 2004/0182273 A1* | 9/2004 | Sawada et al. | 101/491 |
| 2005/0150421 A1* | 7/2005 | Sawada et al. | 106/31.6 |
| 2005/0250876 A1* | 11/2005 | Kawaguchi et al. | 523/160 |

FOREIGN PATENT DOCUMENTS

| | | |
|---|---|---|
| JP | 10-25440 A | 1/1998 |
| JP | 2001-181987 A | 7/2001 |

OTHER PUBLICATIONS

STN Reg File search for Pigment Red 213, Nov. 1984.

* cited by examiner

*Primary Examiner*—Helene Klemanski
(74) *Attorney, Agent, or Firm*—Oliff & Berridge, PLC

(57) ABSTRACT

An ink jet ink set for fabric printing contains a magenta ink containing C.I. Pigment Red 213 and a yellow ink containing a yellow pigment having $L^*a^*b^*$ color system chromas $a^*$ and $b^*$ such that $-18 \leq a^* \leq 0$, and $50 \leq b^* \leq 80$ when printed on fabrics by an ink jet method, whereby a vivid red can be obtained in the printed portions of fabrics upon printing by an ink jet method. Each ink constituting the ink jet ink jet contains an aqueous emulsion.

7 Claims, 2 Drawing Sheets

INK SET FOR INK JET PRINTING

This is a continuation-in-part of application Ser. No. 11/024,900 filed Dec. 30, 2004, and now abandoned. The entire disclosure of the prior application is hereby incorporated by reference herein in its entirety.

The entire disclosure of the specification, claims, summary and drawings of Japanese Patent Application No. 2004-007007 filed on Jan. 14, 2004 is hereby incorporated by reference.

BACKGROUND OF THE INVENTION

1. Field of the Invention

The present invention relates to an ink set used for fabric printing by an ink jet method, and to an ink jet method using this ink set.

2. Description of the Related Art

Ink sets with 3 or 4 colors, yellow inks, magenta inks, blue inks and, as needed, black inks, are widely used conventionally in cases where full color is formed by ink jet methods, where water-soluble dyes for each color are used as coloring agents. Pigment inks using pigments have been adopted as well in recent years, in addition to water-soluble dyes, from the viewpoint of weatherability and water resistance. Fabrics are also printed by ink jet methods using pigment inks.

However, reproduction of vivid hues is more difficult using pigment inks than using dye inks, and the range of hues that can be rendered is narrower. Thus, active research is being conducted on combinations of pigments as coloring agents that may allow obtaining vivid hues in printed portions by ink jet printing using pigment inks (Japanese Patent Application Laid-Open No. H10-25440 and Japanese Patent Application Laid-Open No. 2001-181987).

C.I. Pigment Red 122 is widely used as pigment magenta ink, for instance in the pigment ink disclosed in Japanese Patent Application Laid-Open No. H10-25440.

However, C.I. Pigment Red 122 has the drawbacks of being expensive, difficult to disperse and possessing a weak coloring power, etc., and especially in fabrics, the surface after printing tends to appear white due to fabric fluff. Moreover, vivid reds cannot be obtained either by attempting to render red using yellow inks and magenta inks comprising this C.I. Pigment Red 122, since the resulting red hue is close to magenta.

SUMMARY OF THE INVENTION

In light of the above, an object of the present invention is to provide an ink set of pigment inks for fabric printing by an ink jet method, that allows imparting vivid hues, especially a vivid red, to the printed portion, and to provide an ink jet printing method that allows imparting vivid hues to fabrics, especially forming printed portions with vivid reds on the fabrics, by using a specified ink set.

The inventors perfected the present invention upon discovering that vivid and less color-fading reds could be rendered on fabric by using a C.I. Pigment Red 213 as a magenta pigment, and using a greenish yellow pigment exhibiting, on the fabric, values of chromas a*, b* within a specified range, and in addition thereto, by compounding an aqueous emulsion with ink.

Specifically, the present invention provides an ink jet ink set for fabric printing comprising a magenta ink containing C.I. Pigment Red 213 and a yellow ink containing a yellow pigment having L*a*b* color system chromas a* and b* such that $-18 \leq a^* \leq 0$, and $50 \leq b^* \leq 80$ when printed on fabrics by an ink jet method, and each ink containing an aqueous emulsion.

In particular, the present invention provides embodiments wherein the yellow pigment of the yellow ink in this ink jet ink set for fabric printing is selected from C.I. Pigment Yellow 17, 23, 74, 147, 150, 151, 154, 155, 175, 180 and 185, and embodiments wherein the inks contain aqueous emulsions.

Also, the present invention provides an ink jet printing method comprising the steps of forming red on the fabric by attaching droplets, onto the fabric in an arbitrary sequence, of the each ink of the ink set for fabric ink jet printing containing the aforementioned aqueous emulsions; and fixing the coloring material of the ink onto the fabric by thermal treatment of the fabric.

In the ink set according to the present invention, used are a magenta ink containing C.I. Pigment Red 213 and a greenish yellow ink containing a yellow pigment having L*a*b* color system chromas a* and b* such that $-18 \leq a^* \leq 0$, and $50 \leq b^* \leq 80$ when printed on fabrics by an ink jet method. In addition, an aqueous emulsion is compounded into each of inks constituting the ink set.

Therefore, the ink jet printing method according to the present invention using this ink set for ink jet printing allows achieving less color-fading, vivid and natural red hues on the printed portions while expanding the rendering range in the green region, in which visual perception is high in humans.

Since C.I. Pigment Red 213 has a greater coloring power than C.I. Pigment Red 122, using C.I. Pigment Red 213 as pigment in magenta inks allows reducing to a fifth the amount of magenta pigment that must be used to achieve the same color development as when using C.I. Pigment Red 122.

DESCRIPTION OF THE PREFERRED EMBODIMENTS

Figure 1:
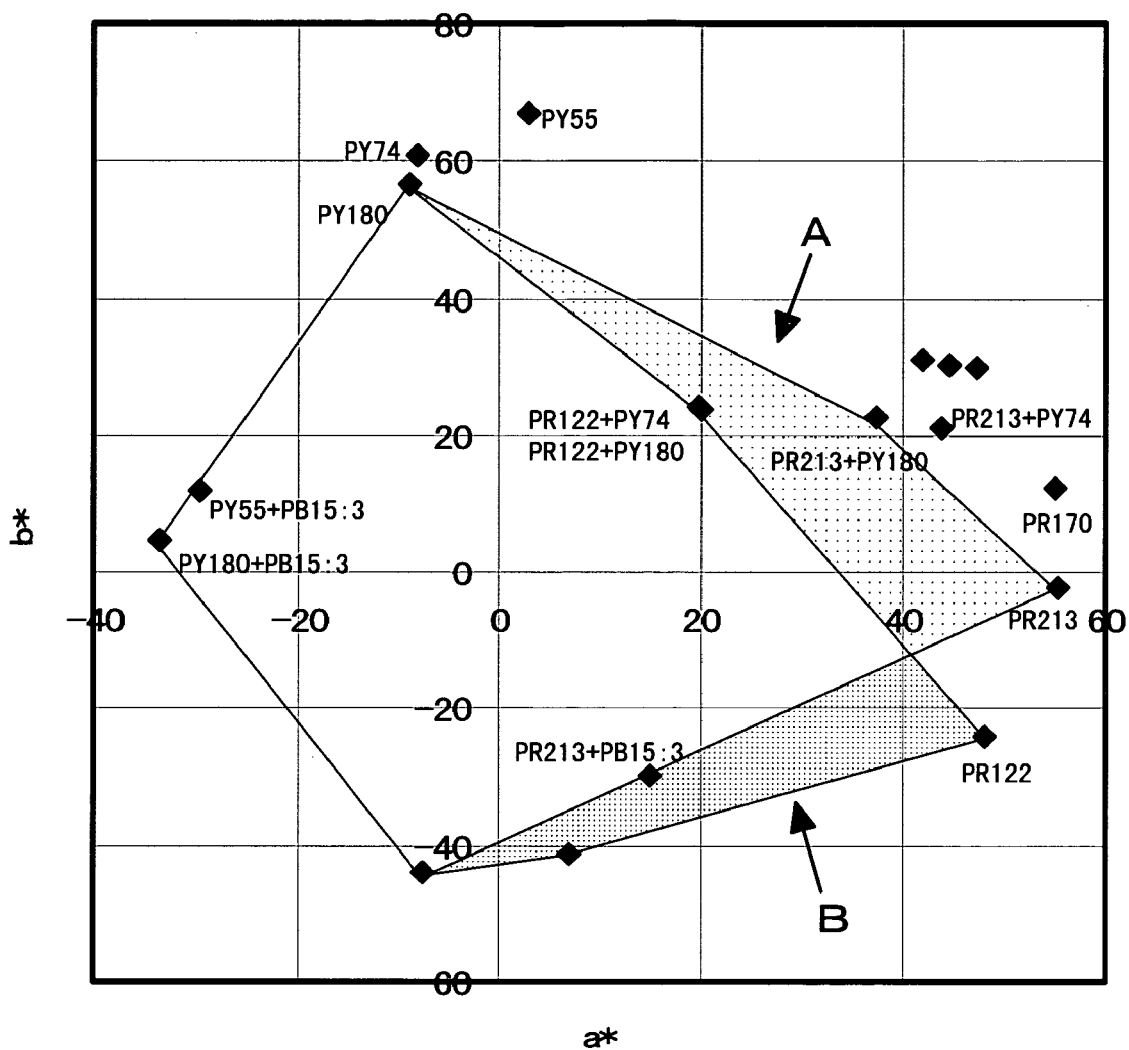
FIG. 1 is an a*-b* graph showing the rendering range expansion in the periphery of red by different magenta pigments.

The ink set of the present invention is explained in detail as below.

The present invention comprises at least a yellow ink and a magenta ink, and may additionally comprise as needed a cyan ink and a black ink.

Herein C.I. Pigment Red 213 is used as the coloring agent of the magenta ink. The use of C.I. Pigment Red 213 allows expanding the rendering range of red in the portions printed by ink-jet, as compared with the conventional C.I. Pigment Red 122 widely used as a magenta ink pigment; thus, vivid reds can be rendered by combining a magenta ink comprising C.I. Pigment Red 213 with a yellow ink with pigments of a specified chroma, as described below. Also, the amount of pigment used can be reduced since C.I. Pigment Red 213 has a stronger coloring power than C.I. Pigment Red 122.

The average volume particle diameter of the C.I. Pigment Red 213 in the magenta ink is set preferably to 50 nm or more from the viewpoint of pigment dispersion stability, color development, weatherability of the pigment, etc., and it is also preferably set to 200 nm or less from the viewpoint of vividness, pigment dispersion stability, color separation, etc.

The amount of C.I. Pigment Red 213 in the magenta ink ranges preferably from 0.1 to 10 wt % from the viewpoint of color density reproducibility and in order to maintain a good dispersibility in the ink, etc.

The pigments used in the yellow ink of the ink set according to the present invention are greenish yellow pigments having L*a*b* color system chromas a* and b* such that $-18 \leq a^* \leq 0$, and $50 \leq b^* \leq 80$, preferably $-15 \leq a^* \leq -5$, and $50 \leq b^* \leq 70$, when printed on fabrics by an ink jet method. Yellow pigments having such chromas that may be used include for instance C.I. Pigment Yellow 3, 4, 5, 7, 17, 23, 50, 51, 74, 81, 98, 105, 147, 150, 151, 154, 155, 175, 180, 185, etc. These can be used singly or in combination as the yellow ink pigment.

By combining a magenta ink comprising C.I. Pigment Red 213 with a yellow ink consisting of yellow pigments having the a* and b* chromas above, it is possible to achieve the rendering of a vivid red in printed portions on fabric. In addition, by combining these yellow inks with ordinary cyan ink-jet inks containing pigments (for instance C.I. Pigment Blue 15:3, 15:4, etc.), it is possible to expand the rendering range in the green region in which visual perception is high in humans. By contrast, using a reddish yellow pigment with a* greater than 0 in combination with C.I. Pigment Red 213 allows expanding the rendering region of yellow, oranges and other hues around red, but this expansion of the red peripheral areas is not meaningful in practice. Also, using such reddish yellow pigments results in a narrowing of the green rendering range, which is undesirable. Using a reddish yellow pigment with a* less than −18 allows results in a narrowing of the red rendering range, which is undesirable.

From the viewpoint of hue balance, there are no yellow pigments having b* over 80 that can be used in practice, while values of b* smaller than 50 result in a darkening of the color of the printed portion, which is equally undesirable.

Preferred yellow pigments, from the viewpoint of color development, photoresistance, thermal resistance, dispersibility, dispersion stability, supply stability, etc. are for instance, C.I. Pigment Yellow 17, 23, 74, 147, 150, 151, 154, 155, 175, 180 and 185 among the above-listed yellow pigments.

In the present invention, the chroma a* and b* values that determine the yellow pigment are the measured chroma a*, b* values (light source D65) of a 100% cotton white sheeting fabric (Hanes Beefy-T) printed by an ink jet method with 0.1 to 100 picoliters per droplet.

The average volume particle diameter of the yellow ink pigment is set preferably to 50 nm or more from the viewpoint of pigment dispersion stability, color development, weatherability of the pigment, etc., and it is also preferably set to 250 nm or less from the viewpoint of vividness, pigment dispersion stability, and color separation, etc.

The amount of pigment in the yellow ink ranges preferably from 0.5 to 15 wt % from the viewpoint of color density reproducibility and in order to maintain a good dispersibility in the ink, etc.

Coloring agents that may be used in cyan inks and black inks include conventional cyan pigments and black pigments, for instance cyan pigments such as C.I. Pigment Blue 15:3, 15:4, etc., and black pigments such as carbon black, etc.

The inks for the different colors that constitute the ink-set according to the present invention contain also aqueous emulsions and aqueous solvents, in addition to the pigments above as coloring agents.

The aqueous emulsions used herein act as pigment dispersants, or binders for fixing the pigments on the fabric, and include aqueous resin emulsions used conventionally in ink-jet inks. Resins constituting these resin emulsions include for instance acrylic resin emulsions, styrene/maleic anhydride copolymer resin emulsions, urethane resin emulsions, vinyl acetate resin emulsions, vinyl acetate/acrylic acid copolymer resin emulsions, vinyl acetate/ethylene copolymer resin emulsions, etc.

The kind of the aqueous emulsion is not particularly restricted and may include anionic, cationic, nonionic, emulsions, etc. Micro-emulsions, gross emulsions, reactive emulsions, 2-layer emulsions etc. may also be used.

The amount of aqueous emulsion in the ink ranges from 0.1 to 73 wt %, preferably from 1 to 30 wt %, from the viewpoint of resin emulsion dispersibility in the ink, adjuvant power for color density reproduction, buffering of interactions with other ink components, etc. The average volume particle diameter of the resin micro-particles that constitute the emulsion ranges herein from 10 nm to 100 nm, preferably from 10 to 50 nm.

Pure water, deionized water, water-soluble organic solvents, etc. may be used as the aqueous solvent. Water-soluble organic solvents include for instance C1-C4 alkyl alcohols, ketones or ketoalcohols, ethers, polyalkylene glycols, alkylene glycols with C2-C6 alkylene groups, glycerin, low alkyl ethers of polyhydric alcohols, N-methyl-2-pyrrolidone, triethanolamine, etc.

The inks for each color constituting the ink set according to the present invention may further contain additives such as surfactants, pH regulators, antifoaming agents, preservatives, etc.

The method for preparing the inks may involve, for instance, dispersing the pigments, the aqueous emulsion, the aqueous solvent, and the additives as needed using dispersing equipment such as a sand mill, a ball mill, a roll mill, etc., and separating the coarser particles by centrifugation in order to obtain the pigment ink. Alternatively, the pigment may be added under stirring to an aqueous solution of aqueous emulsion prepared beforehand, with dispersion being carried out next using dispersion equipment.

The ink jet printing method according to the present invention is a fabric printing method by attaching droplets of the ink of each color onto the fabric by an ink jet method, in an arbitrary sequence, using the ink set according to the present invention which comprises at least red ink and yellow ink; the ink jet printing method comprising the steps of forming a printed portion having red areas on the fabric and fixing the coloring material of the ink onto the fabric by thermal treatment of the fabric.

Ink-jet methods herein include for instance piezo-type methods using piezo elements in the printer head, etc.

The total amount of ink for each color attached as droplets onto the fabric by an ink jet method ranges preferably from 7 to 30 mg per square inch. This allows achieving a good color reproduction and an adequate density.

The fabrics printed by an ink jet method are not particularly restricted provided their raw fibers can be dyed by pigments, and include for instance woven fabrics, knitted fabrics, non-woven fabrics, etc. These may include for instance natural fibers such as cotton, silk, hemp, wool, etc., synthetic fibers such as polyamides, polyesters, acrylics, etc.; regenerated and semi-synthetic fibers such as rayon, acetate, etc.; or blended fibers thereof. Fabrics that may be printed using the method according to the present invention include preferably fabrics having the feel, water absorbance, price and availability of 100% cotton white T-shirts.

Thermal treatment is carried out after forming the printed portion on the fabric in order to fix the color on the fabric;

herein the heating may be applied using a heat roller, by hot air blowing, by steam heating, etc.

After the thermal treatment, the excess pigment or resin from the aqueous emulsion etc. may be washed off as needed.

EXAMPLES

The invention is explained in detail as below by way of the following Examples.

(1) Preparation of the Pigment Ink

A disperser (sand grinder, Igarashi Machinery Co. Ltd.) was filled (filling rate 50 vol %) with 1 mm diameter glass beads or zirconium beads (1 mm diameter), next 10 wt % of C.I. Pigment Red 213 as the pigment, 35 wt % of glycerin as the aqueous solvent, and the balance of pure water were charged in the disperser, then the mixture was crushed for 3 to 4 hours. The product was centrifuged (10000 rpm, 30 minutes) to remove the coarser particles. To this, added was as the aqueous emulsion 4.0 wt % of a 10% aqueous solution of acrylic resin emulsion adjusted to a pH of 8 to 10, yielding a magenta ink (pigment concentration 10 wt %) with dispersed pigment particles having a volume average diameter ranging from 50 nm to 200 nm.

The same ink was prepared using the pigments listed in Table 1 to obtain three magenta inks, three yellow inks and one cyan ink.

(2) Fabric Printing

With the magenta and yellow inks prepared in (1), magenta and yellow solid print images were formed on 100% cotton T-shirts (Hanes Beefy T) using a piezo-type inkjet printer having a 600 dpi resolution, and then red solid print images were formed by jetting equal amounts of magenta and yellow inks, in that order.

The surfaces of the obtained images were measured using a spectrophotometer (CM-3700d, from Minolta Co. Ltd.) to determine their a*, b* chromas in a L*a*b* color system.

Green and blue wet images were formed in a similar way using respectively the yellow and cyan inks, and the magenta and cyan inks prepared in (1), and their a*, b* chromas were determined.

Figure 2:
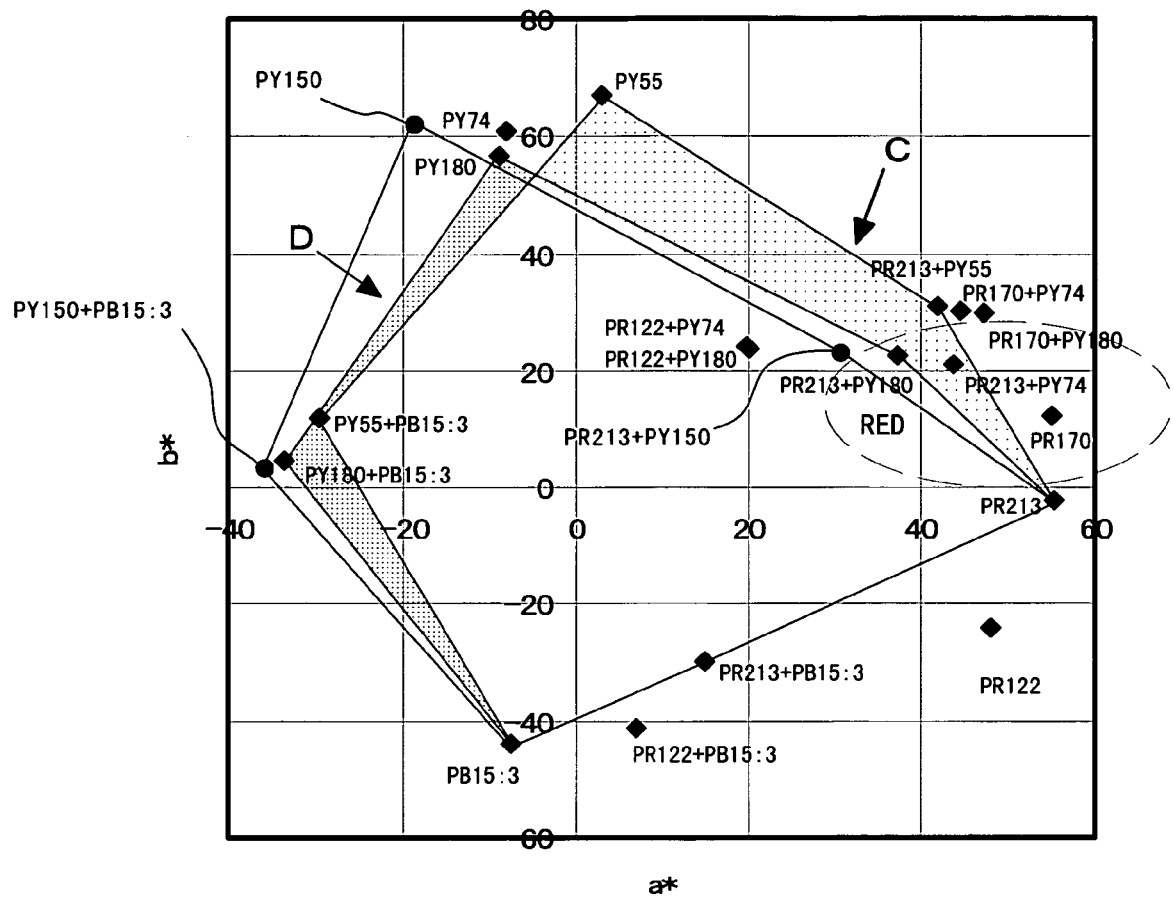
FIG. 2 is an a*-b* graph showing the rendering range expansion of the green area by different yellow pigments.

The results are given in Table 1, FIG. 1 and FIG. 2.

TABLE 1

| No. | | Pigment | a* | b* |
|---|---|---|---|---|
| 1 | Magenta | Pig. R. 213 | 55.090 | -2.318 |
| 2 | | Pig. R. 122 | 48.056 | -24.175 |
| 3 | | P.R. 170 | 55.038 | 12.224 |
| 4 | Yellow | P.Y. 74 | -8.056 | 60.986 |
| 5 | | P.Y. 55 | 2.951 | 66.896 |
| 6 | | P.Y. 180 | -8.943 | 56.830 |
| 7 | | P.Y. 150 | -18.855 | 62.035 |
| 8 | | P.Y. 128 | -20.122 | 60.433 |
| 9 | Cyan | P.B. 15:3 | -7.482 | -44.037 |
| 10 | Red | P.R. 213 + P.Y. 74 | 43.657 | 21.179 |
| 11 | | P.R. 213 + P.Y. 180 | 32.286 | 22.701 |
| 12 | | P.R. 122 + P.Y. 74 | 22.017 | 23.099 |
| 13 | | P.R. 122 + P.Y. 180 | 19.903 | 24.291 |
| 14 | | P.R. 170 + P.Y. 74 | 44.478 | 30.398 |
| 15 | | P.R. 170 + P.Y. 180 | 47.077 | 29.896 |
| 16 | | P.R. 213 + P.Y. 55 | 49.691 | 30.925 |
| 17 | | P.R. 213 + P.Y. 150 | 31.103 | 23.857 |
| 18 | | P.R. 213 + P.Y. 128 | 32.322 | 21.259 |
| 19 | | P.R. 122 + P.Y. 150 | 22.923 | 24.877 |
| 20 | | P.R. 122 + P.Y. 128 | 21.467 | 22.179 |
| 21 | Green | P.Y. 55 + P.B. 15:3 | -29.645 | 11.962 |
| 22 | | P.Y. 180 + P.B. 15:3 | -33.657 | 4.482 |
| 23 | | P.Y. 150 + P.B. 15:3 | -35.021 | 3.627 |
| 24 | | P.Y. 128 + P.B. 15:3 | -36.389 | 3.422 |
| 25 | Blue | P.R. 213 + P.B. 15:3 | 14.891 | -29.963 |
| 26 | | P.R. 122 + P.B. 15:3 | 6.874 | -41.074 |

Table 1 and FIG. 1 show that when C.I. Pigment Red 213 is used as the magenta pigment, the rendering range of red is wider than when C.I. Pigment Red 122 is used. This expanded rendering range is illustrated in FIG. 1 as the coarse-dot shaded area A in FIG. 1.

In this case, the blue rendering range becomes narrower by the fine-dot shaded area B of FIG. 1; however, the expansion of the red rendering range through the use of C.I. Pigment Red 213 has a dramatic effect in enlarging the color development range. This suggests that C.I. Pigment Red 213 is to be preferably used as a magenta pigment.

When a so-called red color C.I. Pigment Red 170 is used as the magenta pigment, the blue rendering range becomes even narrower than when C.I. Pigment Red 213 is used. Therefore, using C.I. Pigment 213 as a magenta pigment allows obtaining an ideal red that need not sacrifice blue rendering range.

On the other hand, the results of table 1 and FIG. 2 show that, compared with using the greenish yellow pigments C.I. Pigment Yellow 74 or 180, when the reddish yellow pigment C.I. Pigment Yellow 55 is used in combination with C.I. Pigment Red 213, the rendering range around red expands (area C in FIG. 2), but when combined with C.I. Pigment Blue 15:3, the green rendering range becomes narrower (area D in FIG. 2). The rendering range of the expanded red periphery corresponds herein to areas of orange and yellow, colors that have little bearing on the rendering of red, and are thus not relevant for color reproduction in practice.

In addition, the results of table 1 and FIG. 2 also show that, compared with using the C.I. Pigment Yellow 180, when the more greenish yellow pigment C.I. Pigment Yellow 150 is used in combination with C.I. Pigment Blue 15:3, the rendering range around green expands, but when combined with C.I. Pigment Red 213, the red rendering range becomes narrower, thereby causing problems on color reproduction in practice. This tendency, when using more greenish yellow pigment C.I. Pigment Yellow 128 as compared with the C.I. Pigment Yellow 150, becomes outstanding (not shown in Figures).

Moreover, the human visual perception is higher for green regions than for red regions. Therefore, it is preferable to use a greenish yellow pigment as the yellow pigment in combination with the C.I. Pigment Red 213 in order to ensure an expansion of the green rendering range, rather than to further expand an already sufficient red rendering range.

The ink set according to the present invention is useful for fabric printing by inkjet methods, in particular for forming vivid red images in the printed portions.

What is claimed is:

1. A method of ink jet printing fabric to provide a print image with a solid red printed portion having a vivid red hue, wherein the method includes the steps of:

pairing, in an ink jet set, a magenta ink containing C.I. Pigment Red 213 and an aqueous emulsion, with a yellow ink containing a yellow pigment and an aqueous emulsion, where the yellow pigment has L*a*b* color system chromas a* and b* such that $-18 \leq a^* \leq 0$, and $50 \leq b^* \leq 80$ when printed on fabrics by an ink jet method;

jetting the magenta ink onto a print area of the fabric; and jetting the yellow ink onto the same print area of the fabric, wherein the magenta ink and yellow ink are jetted onto the print area so as to provide the solid red printed portion having a vivid red hue.

2. The method according to claim 1 wherein the magenta ink is jetted onto the print area of the fabric before the yellow ink is jetted onto the print area of the fabric.

3. The method according to claim 1, further including the step of fixing the pigment of the inks onto the fabric by thermal treatment of the fabric.

4. The method according to claim 1, wherein the magenta ink and yellow ink are jetted such that the amount of ink attached to the fabric ranges from 7 to 30 mg per square inch.

5. The method according to claim 1, wherein the fabric is a sheeting fabric made of cotton, polyester, or blends thereof.

6. The method according to claim 5, wherein the magenta ink and yellow ink are jetted onto the print area such that the solid red printed portion exhibits L*a*b* color system chroma a* of from about 30 to about 45.

7. The method according to claim 6, wherein the magenta ink and yellow ink are jetted onto the print area such that the solid red printed portion exhibits L*a*b* color system chroma b* of from about 20 to about 25.

* * * * *